United States Patent
Yao et al.

(10) Patent No.: US 11,627,510 B2
(45) Date of Patent: *Apr. 11, 2023

(54) DATA PROCESSING METHOD AND APPARATUS, AND COMPUTER STORAGE MEDIUM

(71) Applicant: Huawei Technologies Co., Ltd., Shenzhen (CN)

(72) Inventors: Chuting Yao, Beijing (CN); Haibo Xu, Beijing (CN); Bingzhao Li, Beijing (CN); Zhenzhen Cao, Boulogne Billancourt (FR); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,643

(22) Filed: Mar. 21, 2022

(65) Prior Publication Data
US 2022/0217601 A1    Jul. 7, 2022

Related U.S. Application Data

(63) Continuation of application No. 16/764,299, filed as application No. PCT/CN2018/112277 on Oct. 28, 2018, now Pat. No. 11,304,107.

(30) Foreign Application Priority Data

Nov. 16, 2017    (CN) .......................... 201711140791.8

(51) Int. Cl.
H04W 4/00        (2018.01)
H04W 36/08       (2009.01)
(Continued)

(52) U.S. Cl.
CPC ....... *H04W 36/08* (2013.01); *H04W 12/0431* (2021.01); *H04W 76/19* (2018.02);
(Continued)

(58) Field of Classification Search
None
See application file for complete search history.

(56) References Cited

U.S. PATENT DOCUMENTS

| 2011/0286416 A1 | 11/2011 | Wang et al. |
| 2011/0310995 A1 | 12/2011 | Dougherty, III et al. |

(Continued)

FOREIGN PATENT DOCUMENTS

| CN | 1997204 A | 7/2007 |
| CN | 101483865 A | 7/2009 |

(Continued)

OTHER PUBLICATIONS

Huawei (Rapporteur), "Introduction of NB-IoT", 3GPP TSG-RAN WG2 Meeting #93, R2-161604, St Julian's, Malta, Feb. 15-19, 2016, 281 pages.

(Continued)

*Primary Examiner* — Zewdu A Beyen
(74) *Attorney, Agent, or Firm* — Slater Matsil, LLP

(57) ABSTRACT

This application provides a data processing method and apparatus, and a computer storage medium. When a PDCP entity over a UM DRB is re-established, or when a cell handover occurs and the PDCP entity over a UM DRB uses a key used before the handover, the PDCP entity determines a first SDU, where the first SDU is an SDU that is associated with a sequence number by the PDCP entity but whose corresponding data has not been transmitted through an air interface; and delivers a PDU corresponding to the first SDU (Continued)

to an RLC entity. Data corresponding to the first SDU is redelivered, to avoid a data packet loss caused by preprocessing of the PDCP entity.

20 Claims, 4 Drawing Sheets

(51) Int. Cl.
  *H04W 76/19* (2018.01)
  *H04W 80/02* (2009.01)
  *H04W 80/08* (2009.01)
  *H04W 12/0431* (2021.01)
  *H04W 92/10* (2009.01)

(52) U.S. Cl.
  CPC ........... *H04W 80/02* (2013.01); *H04W 80/08* (2013.01); *H04W 92/10* (2013.01)

(56) References Cited

U.S. PATENT DOCUMENTS

| | | |
|---|---|---|
| 2012/0057546 A1 | 3/2012 | Wang et al. |
| 2015/0327236 A1* | 11/2015 | Lin ................... H04W 72/0406 370/329 |
| 2016/0014647 A1 | 1/2016 | Yi et al. |
| 2016/0164793 A1* | 6/2016 | Basu Mallick ......... H04L 47/32 370/235 |
| 2016/0255675 A1 | 9/2016 | Van Lieshout et al. |
| 2018/0083688 A1* | 3/2018 | Agiwal ................ H04W 76/19 |
| 2018/0376332 A1 | 12/2018 | Basu Mallick et al. |
| 2019/0268100 A1 | 8/2019 | Quan et al. |

FOREIGN PATENT DOCUMENTS

| | | |
|---|---|---|
| CN | 101997660 A | 3/2011 |
| CN | 102045770 A | 5/2011 |
| CN | 103220279 A | 7/2013 |
| CN | 103313325 A | 9/2013 |
| CN | 106559780 A | 4/2017 |
| CN | 107079516 A | 8/2017 |
| EP | 2982173 B1 | 5/2018 |
| JP | 2016514922 A | 5/2016 |
| KR | 20150137064 A | 12/2015 |
| WO | 2015066923 A1 | 5/2015 |
| WO | 2018232108 A1 | 12/2018 |

OTHER PUBLICATIONS

Nokia, Alcatel-Lucent Shanghai Bell, "Enforcing S-KWT change after handover", 3GPP TSG-RAN WG2 Meeting #96, R2-167527, Reno, USA, Nov. 14-18, 2016, 5 pages.

3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification (Release 14)", Sep. 2017, 753 pages.

GPP TS 37.340 V1.2.0, "3rd Generation Partnership Project; Technical Specification Group Radio Access Network; Evolved Universal Terrestrial Radio Access (E-UTRA) and NR; Multi-connectivity; Stage 2 (Release 15)", Nov. 14, 2017, 50 pages.

3GPP TS 38.323 V1.0.0, "3rd Generation Partnership Project; Technical Specification Group Radio Access Network; NR; Packet Data Convergence Protocol (PDCP) specification(Release 15)", Sep. 2017, 29 pages.

3GPP TS 38.331 V0.1.0, "3rd Generation Partnership Project; Technical Specification Group Radio Access Network; NR; Radio Resource Control (RCC); Protocol specification (Release 15)", Oct. 2017, 42 pages.

Nokia et al.,"Considerations on L2 handling for Handover", 3GPP TSG-RAN WG2 NR Adhoc, Athens, Greece, Feb. 13-17, 2017, R2-1700816 (R2-1700071), 6pages.

Nokia, et al., "Considerations on L2 handling for Handover", R2-1703558, 3GPP TSG-RAN WG2 Meeting #97bis, Apr. 3-7, 2017, Spokane, USA, 6 pages.

LG Electronics Inc., "Discussion on PDCP data recovery for UM DRB", R2-1711557, 3GPP TSG-RAN WG2 Meeting #99bis, Prague, Czech Republic, Oct. 9-13, 2017, 3 pages.

LG Electronics Inc. (PDCP rapporteur), "Presentation of Specification/Report to TSG: TS38.323, Version 1.0.0", Tdoc RP-171993, 3GPP TSG-RAN Meeting #77, Sapporo, Japan, Sep. 11-14, 2017, 1 page.

Samsung, "Impact on Control and User Plane procedure due to Intra and Inter CU HO," 3GPP TSG RAN WG2#NR_AdHoc#2 Meeting, Qingdao, China, Jun. 27-29, 2017, R2-1707105, 4 pages.

Samsung, "PDCP buffer management and PDCP SDU recovery," 3GPP TSG-RAN WG2 Meeting #85, R2-141397, Mar. 31 to Apr. 4, 2014, Valencia, Spain, 4 pages.

Sequans Communications, "PDCP retransmissions upon UL path change and re-establishment," 3GPP TSG-RAN WG2 Meeting #99bis, Prague, Czech Republic, Oct. 9-13, 2017, R2-1711653, 6 pages.

* cited by examiner

DATA PROCESSING METHOD AND APPARATUS, AND COMPUTER STORAGE MEDIUM

CROSS-REFERENCE TO RELATED APPLICATIONS

This application is a continuation of U.S. patent application Ser. No. 16/764,299, filed on May 14, 2020, which is a national stage of International Application No. PCT/CN2018/112277, filed on Oct. 28, 2018, which claims priority to Chinese Patent Application No. 201711140791.8, filed on Nov. 16, 2017. All of the aforementioned applications are hereby incorporated by reference in their entireties.

TECHNICAL FIELD

This application relates to communications technologies, and in particular, to a data processing method and apparatus, and a computer storage medium.

BACKGROUND

A radio interface protocol stack is divided into three layers: a physical layer, a link layer, and a network layer. The link layer includes a packet data convergence protocol (Packet Data Convergence Protocol, PDCP) layer, a radio link control (Radio Link Control, RLC) layer, and a media access control (Media Access Control, MAC) layer. The PDCP layer is located above the RLC layer, and the RLC layer is located above the MAC layer. The PDCP layer is used to compress and decompress a packet header of user plane data, encrypt and decrypt the user plane data, perform integrity protection on control plane data, and the like, and deliver the data to the RLC layer in sequence. A sequence of the data is ensured by using sequence numbers (Sequence Number, SN) associated with the data at the PDCP layer. The RLC layer provides segmentation and retransmission services for user data and control data. The RLC layer works in three modes: a transparent mode (TM), an unacknowledged mode (Unacknowledged Mode, UM), and an acknowledged mode (Acknowledge Mode, AM). The RLC layer delivers processed data to the MAC layer, the MAC layer processes the data and then delivers the processed data to the physical layer, and the physical layer sends the data through an air interface.

In a long term evolution (Long Term Evolution, LTE) system, PDCP is being re-established when a terminal device is handed over from one cell to another cell. After PDCP is re-established, a transmit end processes a UM mode data radio bearer (Data Radio Bearer, DRB) in some manners: setting Next_PDCP_TX_SN and TX_HFN to zero; using a new encryption manner and a new key; and for PDCP service data units (Service Data Unit, SDU) that are already associated with SNs, if protocol data units (Protocol Data Unit, PDU) corresponding to the SDUs are not delivered to a lower layer, considering that these SDUs are received from an upper layer, and are transmitted in ascending order based on a count value COUNT (where the COUNT value is a 32-bit number, the first half segment is a hyper frame number HFN, and the second half segment is a sequence number SN) associated before PDCP is re-established, without restarting a packet loss timer (discard Timer).

However, in a 5th generation (5-Generation, 5G) mobile communications system, a base station and a terminal device have a data packet preprocessing function. To be specific, before any transmission resource arrives at an air interface, a PDCP entity delivers a PDCP PDU to an RLC entity, so that the RLC entity generates an RLC PDU. After PDCP is re-established, if data delivered by the PDCP entity to the RLC entity and a MAC entity is not sent through the air interface, and the RLC entity and the MAC entity do not retransmit the preprocessed data, the data is lost.

SUMMARY

This application provides a data processing method and apparatus, and a computer storage medium, to avoid a data packet loss caused by preprocessing of a PDCP entity.

A first aspect of this application provides a data processing method, including: determining, by a PDCP entity, a first SDU, where the first SDU is an SDU that is associated with a sequence number by the PDCP entity but whose corresponding data has not been transmitted through an air interface; and delivering, by the PDCP entity, a protocol data unit PDU corresponding to the first SDU to an RLC entity.

Optionally, the first SDU includes at least one of the following SDUs: an SDU, where the SDU is associated with a sequence number, but a PDU corresponding to the SDU has not been delivered to the RLC entity; an SDU, where data corresponding to the SDU has not been delivered by the RLC entity to a media access control MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

Optionally, the determining, by the PDCP entity, a first SDU includes: receiving, by the PDCP entity, indication information when a PDCP entity over a UM data radio bearer DRB is re-established, or when a cell handover occurs and the PDCP entity over a UM DRB uses a key used before the handover, where the indication information is used to instruct to deliver the PDU corresponding to the first SDU to the RLC entity; and determining, by the PDCP entity, the first SDU based on the indication information.

Optionally, the delivering, by the PDCP entity, a PDU corresponding to the first SDU to the RLC entity includes: considering, by the PDCP entity, that the first SDU is from an upper layer; and delivering, by the PDCP entity in ascending order, PDUs corresponding to the first SDU to the RLC entity.

Optionally, the PDCP entity does not restart a first timer corresponding to the first SDU, and the first timer is started by the PDCP entity when the PDCP entity receives the first SDU from the upper layer.

Optionally, after the cell handover occurs and the PDCP entity over a UM DRB uses the key used before the handover, a count value of the first SDU starts from an initial value, or a count value used before the handover is maintained.

A second aspect of this application provides a data processing method, including: receiving, by a first device, a first message sent by a second device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

When a cell handover occurs and the PDCP entity uses a key used before the handover, the first device receives the first message sent by the second device.

A third aspect of this application provides a data processing method, including: sending, by a second device, a first message to a first device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

Optionally, when a cell handover occurs and the PDCP entity uses a key used before the handover, the second device sends the first message to the first device.

A fourth aspect of this application provides a data processing apparatus, including a PDCP entity and an RLC entity.

The PDCP entity is configured to determine a first service data unit SDU, where the first SDU is an SDU that is associated with a sequence number by the PDCP entity but whose corresponding data has not been transmitted through an air interface.

The PDCP entity is further configured to deliver a protocol data unit PDU corresponding to the first SDU to the RLC entity.

Optionally, the first SDU includes at least one of the following SDUs: an SDU, where the SDU is associated with a sequence number, but a PDU corresponding to the SDU has not been delivered to the RLC entity; an SDU, where data corresponding to the SDU has not been delivered by the RLC entity to a media access control MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

Optionally, that the PDCP entity determines a first SDU includes: receiving indication information when a PDCP entity over an unacknowledged-mode UM data radio bearer DRB is re-established, or when a cell handover occurs and the PDCP entity over a UM DRB uses a key used before the handover, where the indication information is used to instruct to deliver the PDU corresponding to the first SDU to the RLC entity; and determining the first SDU based on the indication information.

Optionally, that the PDCP entity delivers a PDU corresponding to the first SDU to the RLC entity includes: considering that the first SDU is from an upper layer; and delivering, in ascending order, PDUs corresponding to the first SDU to the RLC entity.

Optionally, the PDCP entity does not restart a first timer corresponding to the first SDU, and the first timer is started by the PDCP entity when the PDCP entity receives the first SDU from the upper layer.

Optionally, after the cell handover occurs and the PDCP entity over a UM DRB uses the key used before the handover, a count value of the first SDU starts from an initial value, or a count value used before the handover is maintained.

A fifth aspect of this application provides a first device, including: a receiving module, configured to receive a first message sent by a second device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

Optionally, the receiving module is specifically configured to: when a cell handover occurs and the PDCP entity uses a key used before the handover, receive the first message sent by the second device.

A sixth aspect of this application provides a second device, including: a sending module, configured to send a first message to a first device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

Optionally, the sending module is specifically configured to: when a cell handover occurs and the PDCP entity uses a key used before the handover, send, by the second device, the first message to the first device.

Optionally, in the second aspect, the third aspect, the fifth aspect, and the sixth aspect of this application, when the PDCP entity is a PDCP entity over an acknowledged-mode AM data radio bearer DRB, the first message is used to instruct the first device to recover data; or when the PDCP entity is a PDCP entity over an unacknowledged-mode UM DRB, the first message is used to instruct the first device to deliver the PDU corresponding to the first SDU to the RLC entity; or when the PDCP entity is a PDCP entity over a signaling radio bearer SRB, the first message is used to instruct the first device to clear the data packet.

Optionally, in the second aspect, the third aspect, the fifth aspect, and the sixth aspect of this application, the first message includes a first indication and a second indication.

The first indication is used to instruct the first device to perform the at least one of the following operations: the data recovery, the clearing of a data packet, and the delivery of a PDU corresponding to the first SDU to an RLC entity.

The second indication is used to instruct to re-establish the RLC entity.

Optionally, in the second aspect, the third aspect, the fifth aspect, and the sixth aspect of this application, the first indication and the second indication are sent in a same message or sent in different messages.

Optionally, in the second aspect, the third aspect, the fifth aspect, and the sixth aspect of this application, the first message includes a third indication.

The third indication is used to instruct the first device to perform the at least one of the following operations: the data recovery, the clearing of a data packet, and the delivery of a PDU corresponding to the first SDU to an RLC entity, and is further used to instruct to re-establish PDCP.

Optionally, in the second aspect, the third aspect, the fifth aspect, and the sixth aspect of this application, the third indication includes at least two values.

Some of the at least two values are used to instruct to re-establish PDCP, and the rest of the at least two values is used to instruct to perform the at least one of the following operations: the data recovery, the clearing of a data packet, and the delivery of a PDU corresponding to the first SDU to an RLC entity.

Optionally, in the second aspect, the third aspect, the fifth aspect, and the sixth aspect of this application, the first message includes a fourth indication and a fifth indication.

The fourth indication is used to instruct to re-establish the PDCP entity.

The fifth indication is used to instruct the PDCP entity to use an existing key.

Optionally, in the second aspect, the third aspect, the fifth aspect, and the sixth aspect of this application, the fourth indication and the sixth indication are sent in a same message or sent in different messages.

Optionally, in the second aspect, the third aspect, the fifth aspect, and the sixth aspect of this application, the first message includes a sixth indication, and the sixth indication is used to instruct to re-establish the RLC entity.

When the first device does not receive a seventh indication, the first message is used to instruct the first device to perform at least one of the following operations: the data recovery, the clearing of a data packet, and redelivery of the PDU corresponding to the first SDU to the RLC entity, and the seventh indication is used to instruct to re-establish the PDCP entity.

Optionally, in the second aspect, the third aspect, the fifth aspect, and the sixth aspect of this application, the first message includes an eighth indication, and the eighth indication is used to instruct to re-establish the PDCP entity.

When the first device does not receive a ninth indication, the first message is used to instruct the first device to perform at least one of the following operations: the data recovery, the clearing of a data packet, and redelivery of the PDU corresponding to the first SDU to the RLC entity, and the ninth indication is used to indicate key information.

Optionally, in the second aspect, the third aspect, the fifth aspect, and the sixth aspect of this application, the fifth indication includes at least one of the following: parameter information required for key update; and information about whether to change a key.

Optionally, in the second aspect, the third aspect, the fifth aspect, and the sixth aspect of this application, the cleared data packet indicated by the first message includes all SDUs and PDUs stored in the PDCP entity.

Optionally, in the second aspect, the third aspect, the fifth aspect, and the sixth aspect of this application, the first SDU includes at least one of the following SDUs: an SDU, where the SDU is associated with a sequence number, but a PDU corresponding to the SDU has not been delivered to the RLC entity; an SDU, where data corresponding to the SDU has not been delivered by the RLC entity to a MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

A seventh aspect of this application provides a computer readable storage medium, applied to a data processing apparatus. The computer readable storage medium stores an instruction. When the instruction is executed by a computing apparatus, the data processing apparatus is enabled to perform the data processing method according to the first aspect of this application.

An eighth aspect of this application provides a computer readable storage medium, applied to a first device. The computer readable storage medium stores an instruction. When the instruction is executed by a computing apparatus, the first device is enabled to perform the data processing method according to the second aspect of this application.

A ninth aspect of this application provides a computer readable storage medium, applied to a second device. The computer readable storage medium stores an instruction. When the instruction is executed by a computing apparatus, the second device is enabled to perform the data processing method according to the third aspect of this application.

A tenth aspect of this application provides a data processing apparatus, including a processor, a memory, and a transceiver. The memory is configured to store an instruction, the transceiver is configured to communicate with another device, and the processor is configured to execute the instruction stored in the memory, so that the data processing apparatus performs the data processing method according to the first aspect of this application.

An eleventh aspect of this application provides a first device, including a processor, a memory, and a transceiver. The memory is configured to store an instruction, the transceiver is configured to communicate with another device, and the processor is configured to execute the instruction stored in the memory, so that the first device performs the data processing method according to the second aspect of this application.

A twelfth aspect of this application provides a second device, including a processor, a memory, and a transceiver. The memory is configured to store an instruction, the transceiver is configured to communicate with another device, and the processor is configured to execute the instruction stored in the memory, so that the second device performs the data processing method according to the third aspect of this application.

A thirteenth aspect of this application provides a communications system, including a first device and a second device. The first device is configured to perform the data processing method according to the second aspect of this application, and the second device is configured to perform the data processing method according to the third aspect of this application.

According to the data processing method and apparatus, and the computer storage medium that are provided in this application. When the PDCP entity over a UM DRB is re-established, or when the cell handover occurs and the PDCP entity over a UM DRB uses the key used before the handover, the PDCP entity determines the first SDU, where the first SDU is the SDU that is associated with the sequence number by the PDCP entity but whose corresponding data has not been transmitted through the air interface; and delivers the PDU corresponding to the first SDU to the RLC entity. Data corresponding to the first SDU is redelivered, to avoid a data packet loss caused by preprocessing of the PDCP entity.

DETAILED DESCRIPTION OF ILLUSTRATIVE EMBODIMENTS

Figure 1:
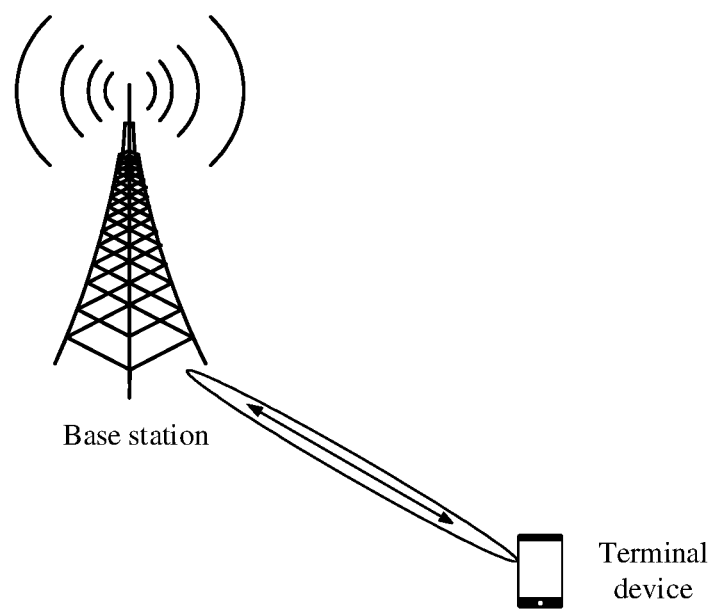
FIG. 1 is a schematic structural diagram of a network architecture to which this application is applicable.
Figure 2:
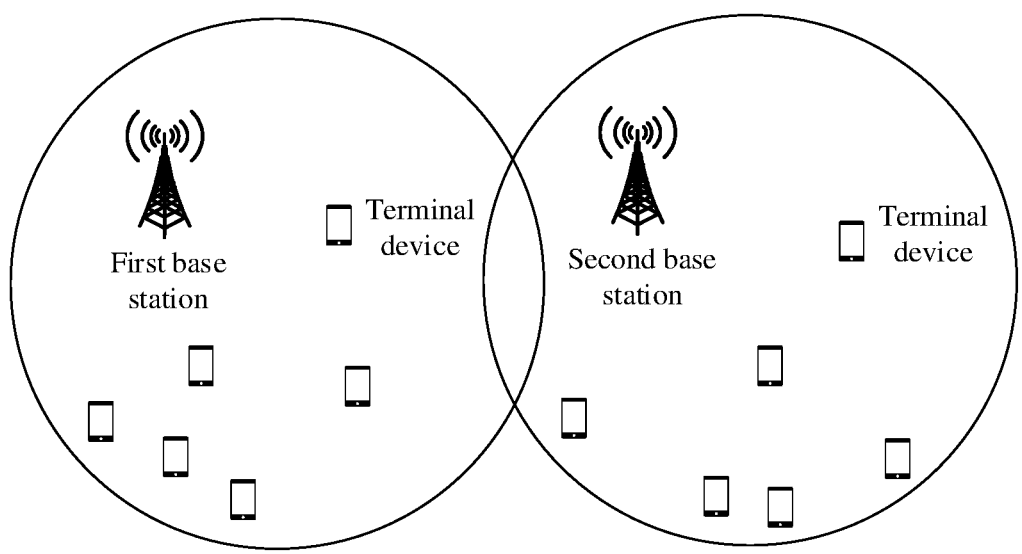
FIG. 2 is a schematic diagram of another network architecture to which this application is applicable.

This application provides a data processing method. FIG. 1 is a schematic structural diagram of a network architecture to which this application is applicable. As shown in FIG. 1, the network architecture includes one base station and a plurality of terminal devices. The plurality of terminal devices are connected to and communicate with the base station. FIG. 2 is a schematic diagram of another network architecture to which this application is applicable. As shown in FIG. 2, the network architecture includes two base stations: a first base station and a second base station. Each base station may be connected to a plurality of terminal devices, and the terminal device may be handed over from a cell in which the first base station is located to a cell in which the second base station is located.

The base station mentioned in this application may be a base transceiver station (Base Transceiver Station, BTS) in a global system for mobile communications (Global System of Mobile communication, GSM) or a code division multiple access (Code Division Multiple Access, CDMA) system, may be a nodeB (NodeB, NB) in a wideband code division multiple access (Wideband Code Division Multiple Access, WCDMA) system, may be an evolved NodeB (evolved NodeB, eNB), an access point (access point, AP), or a relay node in an LTE system, may be a base station (for example, a gNB or a transmission point (Transmission Point, TRP)) in a 5th generation (the 5th Generation mobile communication technology, 5G) mobile communications system, may be a radio controller and a wearable device or a vehicle-mounted device in a cloud radio access network (Cloud Radio Access Network, CRAN) scenario, or the like. This is not limited herein. The 5G communications system is also referred to as a next generation network or a new radio access network (New radio access technical, New RAT or NR). The 5G communications system may include scenarios such as machine-to-machine (Machine to Machine, M2M), D2M, macro-micro communication, enhanced mobile internet (Enhance Mobile Broadband, eMBB), ultra-reliable and low-latency communication (Ultra Reliable & Low Latency Communication, uRLLC), and massive machine-type communications (Massive Machine Type Communication, mMTC).

The terminal device mentioned in this application may be user equipment (User Equipment, UE), an access terminal, a UE unit, a UE station, a mobile station, a mobile console, a remote station, a remote terminal, a mobile device, a UE terminal, a terminal, a wireless communications device, a UE agent, a UE apparatus, or the like. The terminal device may also be a cellular phone, a cordless phone, a session initiation protocol (Session Initiation Protocol, SIP) phone, a wireless local loop (Wireless Local Loop, WLL) station, personal digital processing (Personal Digital Assistant, PDA), a handheld device having a wireless communication function, a computing device, another processing device connected to a wireless modem, a vehicle-mounted device, a wearable device, a terminal in a future 5G network, a terminal in a future evolved public land mobile network (Public Land Mobile Network, PLMN), or the like.

In addition, a communications system in this application may be a public land mobile network (Public Land Mobile Network, PLMN) network, a device-to-device (device-to-device, D2D) network, a machine-to-machine (machine to machine, M2M) network, or another network. The device may be a terminal device or a base station.

Based on the network architectures shown in FIG. 1 and FIG. 2, Embodiment 1 of this application provides a data processing method, to resolve a prior-art problem that a data packet is lost because a PDCP entity preprocesses the data packet. However, this embodiment is not limited to the network architectures in FIG. 1 and FIG. 2.

Figure 3:
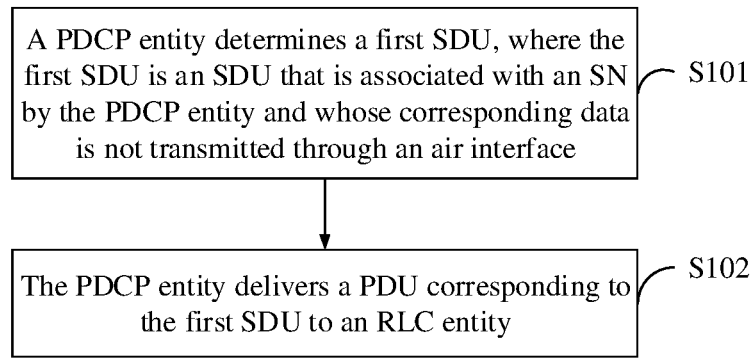
FIG. 3 is a flowchart of a data processing method according to Embodiment 1 of this application.

FIG. 3 is a flowchart of a data processing method according to Embodiment 1 of this application. The method in this embodiment may be performed by a base station or a terminal device. The method in this embodiment is applied to processing of a UM data radio bearer (Data Radio Bearer, DRB), and may be specifically applied to the following two scenarios: A PDCP entity over a UM DRB is re-established, or a cell handover occurs, but a PDCP entity over a UM DRB uses a key used before the handover. As shown in FIG. 3, the method provided in this embodiment includes the following steps:

Step S101: A PDCP entity determines a first service data unit (Service Data Unit, SDU), where the first SDU is an SDU that is associated with an SN by the PDCP entity but whose corresponding data has not been transmitted through an air interface.

The first SDU includes at least one of the following SDUs: an SDU, where the SDU is associated with a sequence number, but a PDU corresponding to the SDU has not been delivered to an RLC entity; an SDU, where data corresponding to the SDU has not been delivered by the RLC entity to a MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

The SDU is an information element from a higher layer protocol, and an SDU at an $N^{th}$ layer is in a one-to-one correspondence with a PDU at a previous layer. Data that is not processed and that enters each sublayer is referred to as an SDU, and data that is in a specific format and that is formed after being processed by the sublayer is referred to as a PDU. In addition, a PDU formed at this layer is an SDU at a next layer. In this embodiment, the data corresponding to the SDU is data included in the SDU, and the data corresponding to the SDU may exist and be transmitted at different layers in different formats. For example, at a PDCP layer, data corresponding to the first SDU is transmitted in a PDCP PDU form; at an RLC layer, the data corresponding to the first SDU is transmitted in an RLC SDU or RLC PDU form; and at a MAC layer, the data corresponding to the first SDU is transmitted in a MAC SDU or MAC PDU form.

In this embodiment, the PDCP entity is a PDCP entity over a UM DRB, and an uplink sending process of the PDCP entity over a UM DRB is as follows: receiving a PDCP SDU from an upper layer, starting a packet loss timer (discard Timer), associating the PDCP SDU with an SN, performing header compression (if header compression is configured) on the PDCP SDU, performing integrity protection and encryption on the PDCP SDU to obtain a PDCP PDU, and delivering the PDCP PDU to the RLC entity. After receiving an RLC SDU (namely, the PDCP PDU) delivered by the PDCP entity, the RLC entity processes the RLC SDU to obtain an RLC PDU, and delivers the RLC PDU to the MAC entity. The MAC entity processes a MAC SDU (namely, the RLC PDU) to obtain a MAC PDU, and then delivers the MAC PDU to the physical layer. When the air interface at the physical layer has an available transmission resource, the physical layer sends a data packet of the MAC PUD by using the transmission resource on the air interface.

The RLC entity works in three modes: an AM, a TM, and a UM. In the UM, when sending data, the RLC entity adds necessary control protocol overheads to a higher layer PDU, and then transmits the data but does not ensure that the data is delivered to a peer entity, and the RLC entity does not use a retransmission protocol.

The DRB is a data bearer between a base station and a terminal device. The DRB is used to transmit service data. One terminal device may establish a plurality of DRBs with the base station. Different DRBs are used to transmit different services. In the UM, there is no data retransmission mechanism, and therefore a data packet may be lost. When the PDCP entity over a UM DRB is re-established, the UM DRB is processed in some prior-art manners: setting Next_PDCP_TX_SN and TX_HFN to zero; using a new encryption manner and a new key; and for PDCP SDUs that are already associated with SNs, if PDUs corresponding to the PDCP SDUs are not delivered to a lower layer, considering that these SDUs are received from the upper layer, and are transmitted in ascending order based on a count value (COUNT) associated before the PDCP entity is re-established, without restarting the packet loss timer.

The COUNT value is a 32-bit number, the first half segment is a hyper frame number (hyper frame number, HFN), and the second half segment is an SN. Next_PDCP_TX_SN is a PDCP SN of a next PDCP SDU of the PDCP entity, and TX_HFN is an HFN used to generate the COUNT value.

In a 5G system, both the base station and the terminal device have a data packet preprocessing function. To be specific, before the air interface has no transmission resource, the PDCP entity associates an SDU with a sequence number, and delivers a PDU corresponding to the SDU to the RLC entity. However, after PDCP is re-established, in the prior art, because the first SDU has been associated with the SN, the PDCP entity does not re-associate the first SDU with a sequence number, and consequently a data packet included in the first SDU is lost. For example, when the PDCP entity is re-established, PDCP PDUs 3 to 9 have been delivered to the RLC entity and the MAC entity through preprocessing, but are not sent through the air interface. After the PDCP entity is re-established, because the PDCP PDUs 3 to 9 have been associated with sequence numbers by the PDCP entity, the PDCP PDUs 3 to 9 are not retransmitted. It should be noted that PDCP re-establishment may or may not be caused by a cell handover.

A new architecture, namely, a CU/DU separation scenario, is introduced into the 5G system. One CU may control a plurality of DUs. For example, when the CU is not changed, the terminal device is handed over from one DU to another DU. Although a cell is changed, because a PDCP layer on a base station side is located on a CU side, the PDCP entity is not changed. Although a cell handover occurs in this scenario, the PDCP entity still uses a key used before the handover. In this scenario, a data packet loss caused by preprocessing also occurs. The PDCP entity may receive indication information sent by an RRC entity. The indication information is used to indicate that the cell handover occurs, but the PDCP entity over a UM DRB uses the key used before the handover. For example, the RRC entity may indicate, by using 1-bit indication information, that the cell handover occurs, but the PDCP entity over a UM DRB uses the key used before the handover.

To resolve a problem of a data packet loss caused by preprocessing of PDCP, in this embodiment, when the PDCP entity over a UM DRB is re-established, or when the cell handover occurs, but the PDCP entity over a UM DRB uses the key used before the handover, the PDCP entity determines the first SDU. The first SDU includes at least one of the following SDUs: an SDU, where the SDU is associated with an SN, but a PDU corresponding to the SDU has not been delivered to the RLC entity; an SDU, where data corresponding to the SDU has not been delivered by the RLC entity to the MAC entity; an SDU, where data corresponding to the SDU has not been delivered by the MAC entity to the physical layer; and an SDU, where data corresponding to the SDU is delivered to the physical layer, but the data corresponding to the SDU has not been sent by the physical layer through the air interface.

Optionally, the PDCP entity receives the indication information. The indication information is used to instruct to deliver a PDU corresponding to the first SDU to the RLC entity. The PDCP entity determines the first SDU based on the indication information. The indication information is sent by the base station to the terminal device. Subsequently, when the PDCP entity over a UM DRB is re-established, or when the cell handover occurs, but the PDCP entity over a UM DRB uses the key used before the handover, the RLC entity may notify, by using a bitmap (bitmap), PDCP of information about an SDU corresponding to a PDU that needs to be delivered to the RLC entity. The bitmap may include a plurality of bits (bit), each bit corresponds to a COUNT value of one PDCP PDU, and a value of each bit is 0 or 1. The RLC entity may start from a COUNT value of a PDU that is recently delivered by the PDCP entity to the RLC entity, 1 is used to indicate that the PDCP PDU corresponding to the COUNT value is already transmitted on the air interface, and 0 is used to indicate that the PDCP PDU corresponding to the COUNT value has not been transmitted on the air interface. Each PDCP PDU corresponds to one PDCP SDU. The PDCP entity learns, based on whether the PDCP PDU is transmitted on the air interface, whether the PDCP SDU corresponding to the PDCP PDU needs to be redelivered to the RLC entity. Alternatively, 1 is used to indicate that the PDCP PDU corresponding to the COUNT value needs to be redelivered to the RLC entity, and 0 is used to indicate that the PDCP PDU corresponding to the COUNT value does not need to be redelivered to the RLC entity. The PDCP entity learns, based on a PDCP SDU corresponding to the PDCP PDU, that the first SDU is required. Optionally, the RLC entity may alternatively directly notify the PDCP entity of a minimum COUNT value of a PDCP PDU that needs to be redelivered. The PDCP entity obtains, based on the minimum COUNT value, the PDCP PDU that needs to be redelivered to the RLC entity, and obtains the first SDU based on the PDCP SDU corresponding to the PDCP PDU. For an SDU that is associated with an SN but has not been delivered to the RLC entity, the PDCP entity may obtain the SDU from a buffer and use the SDU as the first SDU.

Step S102: The PDCP entity delivers the PDU corresponding to the first SDU to the RLC entity.

For example, the PDCP entity considers (consider) that the first SDU is from the upper layer, and then delivers, in ascending order, PDUs corresponding to the first SDU to the RLC entity. There may be one or more first SDUs.

In a scenario in which the PDCP entity is re-established, the PDCP entity uses, in a sequence of COUNT values that are of first SDUs and that are used before the re-establishment, COUNT values used after the reestablishment to sort the first SDUs, where the COUNT values used after the PDCP entity is re-established are set to initial values. The COUNT values that are of the first SDUs and that are used before and after the re-establishment are different, but a sequence of the first SDUs remains unchanged. For example, there are three first SDUs, COUNT of an SDU 1 is 7, a COUNT value of an SDU 2 is 8, and a COUNT value of an SDU 3 is 9. A COUNT value used after the PDCP entity is re-established is set to an initial value. Assuming that the initial value of the COUNT value is 0, after the PDCP entity is re-established, the COUNT value of the SDU 1 is 0, the COUNT value of the SDU 2 is 1, and the COUNT value of the SDU 3 is 2. In other words, after the PDCP entity is re-established, a sequence relationship between the first SDUs remains unchanged.

In a scenario in which the cell handover occurs, but the PDCP entity over a UM DRB uses the key used before the handover, a count value of a data packet delivered by the PDCP entity to a lower-layer entity may start from an initial value, or a count value used before the handover may be maintained.

Optionally, the PDCP entity does not restart a first timer corresponding to the first SDU. The first timer is started by the PDCP entity when the PDCP entity receives the first SDU from the upper layer, and the first timer may be a packet loss timer. The packet loss timer is configured to control time validity of a data packet. If the data packet has not been transmitted when the first timer expires, the data packet is still an invalid packet even if the data packet is transmitted subsequently. Therefore, in this embodiment, the first SDU still uses the first timer used before the re-establishment, or uses the first timer used before the cell handover, to ensure validity of the data packet.

Optionally, in the foregoing two scenarios, before first timers of SDUs in the buffer expire, the PDCP entity may further discard all SDUs that are already transmitted through the air interface. In an existing mechanism, the PDCP entity starts one first timer for each SDU. Even if a data packet included in an SDU is already transmitted through the air interface, the SDU is still stored in the buffer, and the PDCP entity deletes the SDU from the buffer only when timing of the first timer of the SDU expires. In this embodiment, after the SDU is sent from the air interface, the SDU is deleted from the buffer in time, to avoid a buffer overflow.

In this embodiment, the PDCP entity determines the first SDU that needs to be delivered to the RLC entity, where the first SDU is the SDU that is associated with the sequence number by the PDCP entity and that has not been transmitted through the air interface; and delivers the PDU corresponding to the first SDU to the RLC entity. The first SDU is redelivered, to avoid a data packet loss caused by preprocessing of the PDCP entity.

Figure 4:
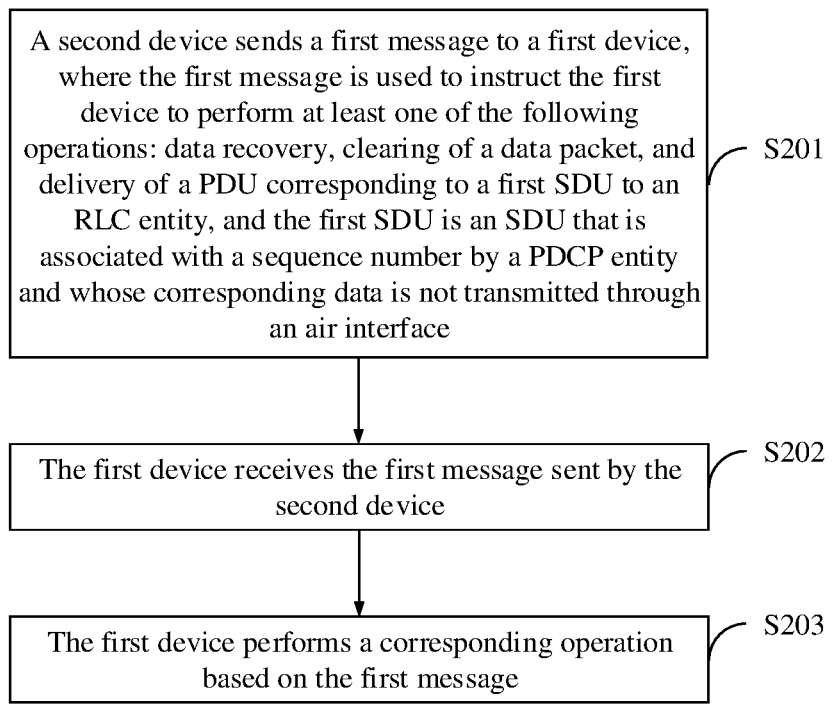
FIG. 4 is a flowchart of a data processing method according to Embodiment 2 of this application.

Based on the network architectures shown in FIG. 1 and FIG. 2, Embodiment 2 of this application provides a data processing method. FIG. 4 is a flowchart of a data processing method according to Embodiment 2 of this application. In this embodiment, a second device may be a base station or another network device, and a first device is a terminal device. As shown in FIG. 4, the method provided in this embodiment includes the following steps.

Step S201: The second device sends a first message to the first device, where the first message is used to instruct the first device to perform at least one of the following operations: data recovery (data recovery), clearing of a data packet, and delivery of a PDU corresponding to a first SDU to an RLC entity, and the first SDU is an SDU that is associated with a sequence number by a PDCP entity but whose corresponding data has not been transmitted through an air interface.

Optionally, when a cell handover occurs and the PDCP entity uses a key used before the handover, the second device sends the first message to the first device.

Step S202: The first device receives the first message sent by the second device.

Optionally, when a cell handover occurs and the PDCP entity uses a key used before the handover, the first device receives the first message sent by the second device.

When the PDCP entity is a PDCP entity over an AM DRB, the first message is used to instruct the first device to recover data.

When the PDCP entity is a PDCP entity over a UM DRB, the first message is used to instruct the PDCP entity of the first device to deliver the PDU corresponding to the first SDU to the RLC entity. The first SDU includes at least one of the following SDUs: an SDU, where the SDU is associated with an SN, but a PDU corresponding to the SDU has not been delivered to the RLC entity; an SDU, where data corresponding to the SDU has not been delivered by the RLC entity to a MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

When the PDCP entity is a PDCP entity over an SRB, the first message is used to instruct the first device to clear the data packet. The SRB is a service provided by an RLC layer for a user, and the SRB is mainly used to carry signaling. For example, in an LTE system, the SRB is used to transmit only a non-access stratum (Non-access stratum, NAS) message and a radio resource control (Radio Resource Control, RRC) message. Optionally, the cleared data packet indicated by the first message includes all SDUs and PDUs stored in the PDCP entity.

The second device may explicitly or implicitly instruct the first device to perform the at least one of the following operations: the data recovery, the clearing of a data packet, and the delivery of a PDU corresponding to a first SDU to an RLC entity. Specifically, indication may be performed in the following manners:

In a first indication manner, the first message includes a first indication and a second indication. The first indication is used to instruct the first device to perform the at least one of the following operations: the data recovery, the clearing of a data packet, and the delivery of a PDU corresponding to a first SDU to an RLC entity. The second indication is used to instruct to re-establish the RLC entity.

It should be noted that the first message does not indicate one message, but indicates one type of message. The type of message is used to instruct the first device to perform the at least one of the following operations: the data recovery, the clearing of a data packet, and the delivery of a PDU corresponding to a first SDU to an RLC entity. Therefore, the first indication and the second indication may be sent in a same message, or may be sent in different messages.

In a second indication manner, the first message includes a third indication. The third indication is used to instruct the first device to perform the at least one of the following operations: the data recovery, the clearing of a data packet, and the delivery of a PDU corresponding to the first SDU to an RLC entity, and is further used to instruct to re-establish PDCP. In this manner, an existing PDCP re-establishment indication is reused. To be specific, the third indication can not only be used to instruct to re-establish PDCP, but also used to instruct to perform the at least one of the following operations: the data recovery, the clearing of a data packet, and the delivery of a PDU corresponding to a first SDU to an RLC entity.

Optionally, the third indication includes at least two values. Some of the at least two values are used to instruct to re-establish PDCP, and the rest of the at least two values is used to instruct to perform the at least one of the following operations: the data recovery, the clearing of a data packet, and the delivery of a PDU corresponding to a first SDU to an RLC entity. For example, the third indication includes two values. One of the two values is used to instruct to re-establish PDCP, and the other one of the two values is used to instruct to perform the at least one of the following operations: the data recovery, the clearing of a data packet, and the delivery of a PDU corresponding to a first SDU to an RLC entity.

Optionally, the third indication may alternatively be a multi-bit value, for example, a 2-bit value, and is used to instruct to perform the at least one of the following operations: the data recovery, the clearing of a data packet, and the delivery of a PDU corresponding to a first SDU to an RLC entity.

Optionally, another indication may be further reused as the third indication.

In a third indication manner, the first message includes a fourth indication and a fifth indication. The fourth indication is used to instruct to re-establish the PDCP entity. The fifth indication is used to instruct the PDCP entity to use an existing key. Optionally, the fifth indication includes at least one of the following: parameter information required for key update, and information about whether to change a key. The information about whether to change a key may be indicated by using a bit. For example, when a value of the bit is 1, it indicates that the key needs to be changed, in other words, a key used after the PDCP entity is re-established is used. When a value of the bit is 0, it indicates that the key does not need to be changed.

Optionally, the fourth indication and the fifth indication may be sent in a same message, or may be sent in different messages.

In a fourth indication manner, the first message includes a sixth indication, and the sixth indication is used to instruct to re-establish the RLC entity. When the first device does not receive a seventh indication, the first message is used to instruct the first device to perform at least one of the following operations: the data recovery, the clearing of a data packet, and redelivery of the PDU corresponding to the first SDU to the RLC entity, and the seventh indication is used to instruct to re-establish the PDCP entity.

In a fifth indication manner, the first message includes an eighth indication, and the eighth indication is used to instruct to re-establish the PDCP entity. When the first device does not receive a ninth indication, the first message is used to instruct the first device to perform at least one of the following operations: the data recovery, the clearing of a data packet, and redelivery of the PDU corresponding to the first SDU to the RLC entity, and the ninth indication is used to indicate key information.

Step S203: The first device performs a corresponding operation based on the first message.

Specifically, in an AM DRB scenario, the first device recovers data based on the first message. In a UM DRB scenario, the first device delivers, based on the first message, the PDU corresponding to the first SDU to the RLC entity. In an SRB scenario, the first device clears the data packet based on the first message.

In the AM DRB scenario, in an existing mechanism, the first device needs to determine, based on a scenario change, whether to recover the data. The data recovery is that a transmit end, namely, the PDCP entity, learns, by using the RLC entity, data packets on which acknowledgment feedback is not received from a receive side, and then the PDCP entity retransmits the data packets on which acknowledgment feedback is not received. In the solution in this embodiment, the second device explicitly instructs the first device to recover the data, so that implementation is simple.

In the UM DRB scenario, the second device instructs the first device to deliver the PDU corresponding to the first SDU to the RLC entity, so that a data packet loss caused by preprocessing of the PDCP entity can be avoided.

In the SRB scenario, for the SRB, only the PDCP entity is re-established. During re-establishment of the PDCP entity, the following operations are performed: setting TX_NEXT to an initial value; deleting all stored PDCP SDUs and PDUs in a buffer; using a new encryption algorithm and a new key; and performing new integrity protection and using a new key. If a cell handover occurs, and the PDCP entity over an SRB uses a key used before the handover, the PDCP entity does not process a data packet stored in the PDCP entity. Because the data packet over the SRB is related to a cell, after the cell handover, expiration information over the SRB may be sent to a new cell. However, for the SRB, only the PDCP entity is re-established during the cell handover. Therefore, during a cell handover without a key change, the expiration information over the SRB may be sent to the new cell. In this embodiment, the second device instructs, by using the first message, the PDCP entity to clear, when the cell handover occurs and the PDCP entity over an SRB uses the key used before the handover, the data packet stored in the buffer, to avoid sending the expiration information to the new cell.

Figure 5:
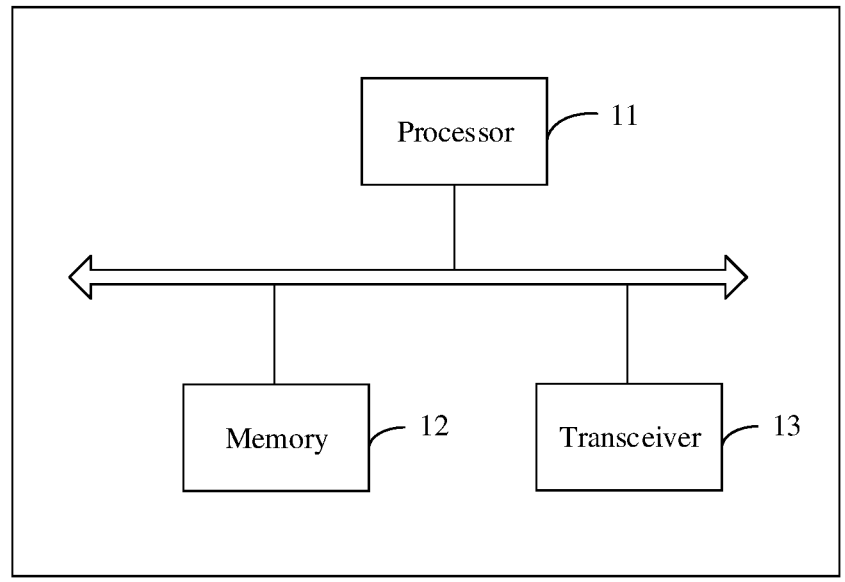
FIG. 5 is a schematic structural diagram of a data processing apparatus according to Embodiment 3 of this application.

FIG. 5 is a schematic structural diagram of a data processing apparatus according to Embodiment 3 of this application. As shown in FIG. 5, the data processing apparatus provided in this embodiment includes a processor 11, a memory 12, and a transceiver 13. The memory 12 is configured to store an instruction, the transceiver 13 is configured to communicate with another device, and the processor 11 is configured to execute the instruction stored in the memory 12, so that the data processing apparatus performs the data processing method in Embodiment 1. A specific implementation and a technical effect are similar to those of the data processing method in Embodiment 1. Details are not described herein again.

Figure 6:
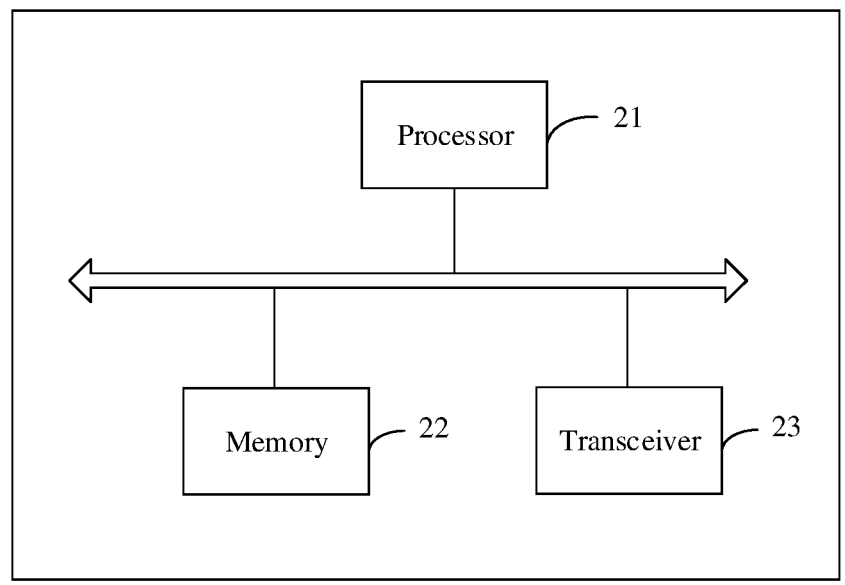
FIG. 6 is a schematic structural diagram of a first device according to Embodiment 4 of this application.

FIG. 6 is a schematic structural diagram of a first device according to Embodiment 4 of this application. As shown in FIG. 6, the first device provided in this embodiment includes a processor 21, a memory 22, and a transceiver 23. The memory 22 is configured to store an instruction, the transceiver 23 is configured to communicate with another device, and the processor 21 is configured to execute the instruction stored in the memory 22, so that the first device performs the method steps performed by the first device in Embodiment 2. A specific implementation and a technical effect are similar to those of the first device in Embodiment 2. Details are not described herein again.

Figure 7:
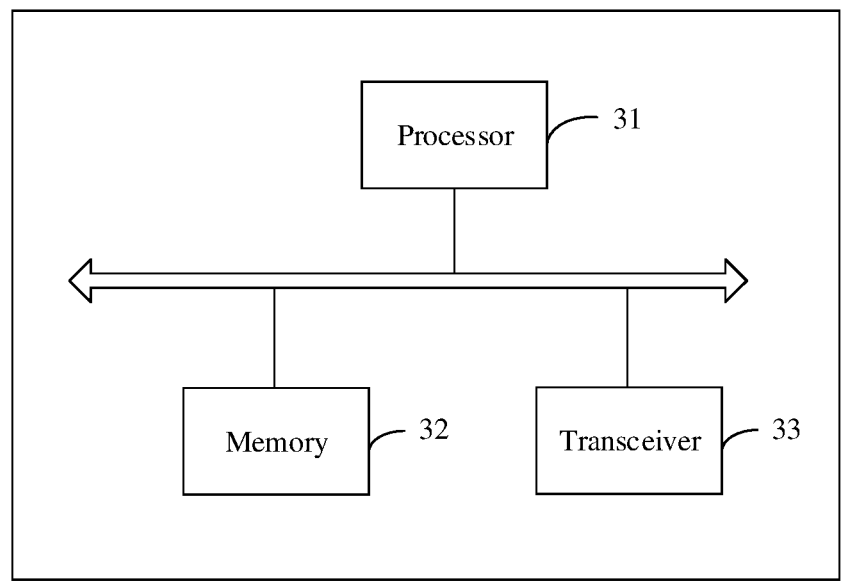
FIG. 7 is a schematic structural diagram of a second device according to Embodiment 5 of this application.

FIG. 7 is a schematic structural diagram of a second device according to Embodiment 5 of this application. As shown in FIG. 7, the second device provided in this embodiment includes a processor 31, a memory 32, and a transceiver 33. The memory 32 is configured to store an instruction, the transceiver 33 is configured to communicate with another device, and the processor 31 is configured to execute the instruction stored in the memory 32, so that the second device performs the method steps performed by the second device in Embodiment 2. A specific implementation and a technical effect are similar to those of the second device in Embodiment 2. Details are not described herein again.

Figure 8:
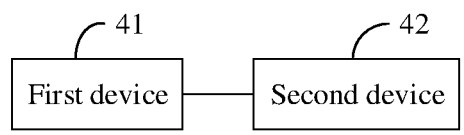
FIG. 8 is a schematic structural diagram of a communications system according to Embodiment 6 of this application.

FIG. 8 is a schematic structural diagram of a communications system according to Embodiment 6 of this application. As shown in FIG. 8, the communications system provided in this embodiment includes a first device 41 and a second device 42. The first device 41 is configured to perform the method steps performed by the first device in Embodiment 2, and the second device 42 is configured to perform the method steps performed by the second device in Embodiment 2. Specific implementations and technical effects are similar to those of the first device and the second device in Embodiment 2. Details are not described herein again.

Figure 9:
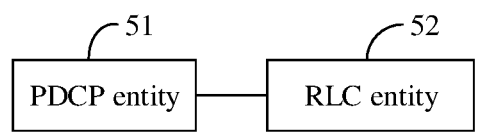
FIG. 9 is a schematic structural diagram of a data processing apparatus according to Embodiment 7 of this application.

FIG. 9 is a schematic structural diagram of a data processing apparatus according to Embodiment 7 of this application. As shown in FIG. 9, the data processing apparatus provided in this embodiment includes a PDCP entity 51 and an RLC entity 52.

The PDCP entity 51 is configured to determine a first service data unit SDU, where the first SDU is an SDU that is associated with a sequence number by the PDCP entity 51 but whose corresponding data has not been transmitted through an air interface.

The PDCP entity 51 is further configured to deliver a protocol data unit PDU corresponding to the first SDU to the RLC entity 52.

Optionally, the first SDU includes at least one of the following SDUs: an SDU, where the SDU is associated with a sequence number, but a PDU corresponding to the SDU has not been delivered to the RLC entity; an SDU, where data corresponding to the SDU has not been delivered by the RLC entity to a media access control MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

Optionally, that the PDCP entity 51 determines a first SDU includes: receiving indication information when a PDCP entity over a UM data radio bearer DRB is re-established, or when a cell handover occurs and the PDCP entity over a UM DRB uses a key used before the handover, where the indication information is used to instruct to deliver the PDU corresponding to the first SDU to the RLC entity; and determining the first SDU based on the indication information.

Optionally, that the PDCP entity 51 delivers a PDU corresponding to the first SDU to the RLC entity includes: considering that the first SDU is from an upper layer; and delivering, in ascending order, PDUs corresponding to the first SDU to the RLC entity.

Optionally, the PDCP entity 51 does not restart a first timer corresponding to the first SDU, and the first timer is started by the PDCP entity 51 when the PDCP entity 51 receives the first SDU from the upper layer.

Optionally, after the cell handover occurs and the PDCP entity over a UM DRB uses the key used before the handover, a count value of the first SDU starts from an initial value, or a count value used before the handover is maintained.

The data processing apparatus provided in this embodiment may be configured to perform the method in Embodiment 1. A specific implementation and a technical effect are similar to those of the method in Embodiment 1. Details are not described herein again.

Embodiment 8 of this application provides a first device, including a receiving module, configured to receive a first message sent by a second device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

Optionally, the receiving module is specifically configured to: when a cell handover occurs and the PDCP entity uses a key used before the handover, receive the first message sent by the second device.

The first device further includes a processing module, and the processing module is configured to perform a corresponding action based on the first message.

Embodiment 9 of this application provides a second device, including a sending module, configured to send a first message to a first device, where the first message is used to instruct the first device to perform at least one of the following operations: data recovery, clearing of a data packet, and delivery of a protocol data unit PDU corresponding to a first service data unit SDU to a radio link control RLC entity, and the first SDU is an SDU that is associated with a sequence number by a packet data convergence protocol PDCP entity but whose corresponding data has not been transmitted through an air interface.

Optionally, the sending module is specifically configured to: when a cell handover occurs and the PDCP entity uses a key used before the handover, send, by the second device, the first message to the first device.

Optionally, in Embodiment 8 and Embodiment 9 of this application, when the PDCP entity is a PDCP entity over an acknowledged-mode AM data radio bearer DRB, the first message is used to instruct the first device to recover data; or when the PDCP entity is a PDCP entity over an unacknowledged-mode UM DRB, the first message is used to instruct the first device to deliver the PDU corresponding to the first SDU to the RLC entity; or when the PDCP entity is a PDCP entity over a signaling radio bearer SRB, the first message is used to instruct the first device to clear the data packet.

Optionally, in Embodiment 8 and Embodiment 9 of this application, the first message includes a first indication and a second indication. The first indication is used to instruct the first device to perform the at least one of the following operations: the data recovery, the clearing of a data packet, and the delivery of a PDU corresponding to the first SDU to an RLC entity. The second indication is used to instruct to re-establish the RLC entity.

Optionally, in Embodiment 8 and Embodiment 9 of this application, the first indication and the second indication are sent in a same message or sent in different messages.

Optionally, in Embodiment 8 and Embodiment 9 of this application, the first message includes a third indication.

The third indication is used to instruct the first device to perform the at least one of the following operations: the data recovery, the clearing of a data packet, and the delivery of a PDU corresponding to the first SDU to an RLC entity, and is further used to instruct to re-establish PDCP.

Optionally, in Embodiment 8 and Embodiment 9 of this application, the third indication includes at least two values. Some of the at least two values are used to instruct to re-establish PDCP, and the rest of the at least two values is used to instruct to perform the at least one of the following operations: the data recovery, the clearing of a data packet, and the delivery of a PDU corresponding to the first SDU to an RLC entity.

Optionally, in Embodiment 8 and Embodiment 9 of this application, the first message includes a fourth indication and a fifth indication. The fourth indication is used to instruct to re-establish the PDCP entity. The fifth indication is used to instruct the PDCP entity to use an existing key.

Optionally, in Embodiment 8 and Embodiment 9 of this application, the fourth indication and the fifth indication are sent in a same message or sent in different messages.

Optionally, in Embodiment 8 and Embodiment 9 of this application, the first message includes a sixth indication, and the sixth indication is used to instruct to re-establish the RLC entity. When the first device does not receive a seventh indication, the first message is used to instruct the first device to perform at least one of the following operations: the data recovery, the clearing of a data packet, and redelivery of the PDU corresponding to the first SDU to the RLC entity, and the seventh indication is used to instruct to re-establish the PDCP entity.

Optionally, in Embodiment 8 and Embodiment 9 of this application, the first message includes an eighth indication, and the eighth indication is used to instruct to re-establish the PDCP entity. When the first device does not receive a ninth indication, the first message is used to instruct the first device to perform at least one of the following operations: the data recovery, the clearing of a data packet, and redelivery of the PDU corresponding to the first SDU to the RLC entity, and the ninth indication is used to indicate key information.

Optionally, in Embodiment 8 and Embodiment 9 of this application, the fifth indication includes at least one of the following: parameter information required for key update, and information about whether to change a key.

Optionally, in Embodiment 8 and Embodiment 9 of this application, the cleared data packet indicated by the first message includes all SDUs and PDUs stored in the PDCP entity.

Optionally, in Embodiment 8 and Embodiment 9 of this application, the first SDU includes at least one of the following SDUs: an SDU, where the SDU is associated with a sequence number, but a PDU corresponding to the SDU has not been delivered to the RLC entity; an SDU, where data corresponding to the SDU has not been delivered by the RLC entity to a MAC entity; an SDU, where data corresponding to the SDU has not been delivered by the MAC entity to a physical layer; and an SDU, where data corresponding to the SDU is delivered to the physical layer, but the data corresponding to the SDU has not been sent by the physical layer through the air interface.

It may be understood that the processor used by the data processing apparatus, the first device, and the second device in this application may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of a DSP and a microprocessor.

The bus in this application may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, the bus in the accompanying drawings of this application is not limited to only one bus or only one type of bus.

In the several embodiments provided in this application, it should be understood that the disclosed apparatus and method may be implemented in another manner. For example, the foregoing described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of hardware in addition to a software function unit.

What is claimed is:

1. A method, comprising:
receiving, by a first device, a first message from a second device, wherein a cell handover or a cell change has occurred, and wherein a Packet Data Convergence Protocol (PDCP) entity uses a key used before the cell handover or the cell change, and wherein the first message comprises a first indication and a second indication, the first indication instructing the first device to perform at least one of the following operations: a data recovery, a discarding of a data packet, or a delivery of a protocol data unit (PDU) corresponding to a first Service Data Unit (SDU) to a Radio Link Control (RLC) entity, and the second indication instructing to re-establish the RLC entity;
performing, based on the first indication, the data recovery, the discarding of the data packet, or the delivery of the PDU corresponding to the first SDU to the RLC entity; and re-establishing, based on the second indication, the RLC entity.

2. The method according to claim 1, wherein:
in response to determining that the PDCP entity is a PDCP entity over a signaling radio bearer (SRB), the first message instructs the first device to clear the data packets.

3. The method according to claim 1, wherein the data packets indicated by the first message comprises all Service Data Units (SDUs) and Protocol Data Units (PDUs) stored in the PDCP entity.

4. The method according to claim 1, wherein:
the first message comprises a third indication; and
the third indication instructs the first device to perform data recovery, clear a data packet, or deliver a Protocol Data Unit (PDU) corresponding to a first Service Data Unit (SDU) to a Radio Link Control (RLC) entity, and the third indication further instructs the first device to re-establish PDCP.

5. The method according to claim 4, wherein:
the third indication comprises a plurality of values;
one or more first values of the plurality of values instructs the first device to re-establish PDCP; and
one or more second values of the plurality of values instructions the first device to perform data recovery, clear the data packet, or deliver the PDU corresponding to the first SDU to the RLC entity.

6. The method according to claim 1, wherein in response to determining that the PDCP entity is a PDCP entity over an unacknowledged-mode (UM) DRB, the first message instructs the first device to deliver a Protocol Data Unit (PDU) corresponding to a first Service Data Unit (SDU) to a Radio Link Control (RLC) entity.

7. The method according to claim 1, wherein in response to determining that the PDCP entity is a PDCP entity over an acknowledged-mode (AM) data radio bearer (DRB), the first message instructs the first device to recover data.

8. A first device, comprising:
at least one processor; and
at least one memory, the at least one memory comprising instructions that when executed by the at least one processor, cause the device to:
receive a first message from a second device, wherein a cell handover or a cell change has occurred, and wherein a Packet Data Convergence Protocol (PDCP) entity uses a key before the cell handover or the cell change, and wherein the first message comprises a first indication and a second indication, the first indication instructing the first device to perform at least one of the following operations: a data recovery, a discarding of a data packet, or a delivery of a protocol data unit (PDU) corresponding to a first Service Data Unit (SDU) to a Radio Link Control (RLC) entity, and the second indication instructing to re-establish the RLC entity;
perform, based on the first indication, the data recovery, the discarding of the data packet, or the delivery of the PDU corresponding to the first SDU to the RLC entity; and
re-establish, based on the second indication, the RLC entity.

9. The device according to claim 8, wherein:
in response to determining that the PDCP entity is a PDCP entity over a signaling radio bearer (SRB), the first message instructs the first device to clear the data packets.

10. The device according to claim 8, wherein the data packets indicated by the first message comprises all Service Data Units (SDUs) and Protocol Data Units (PDUs) stored in the PDCP entity.

11. The device according to claim 8, wherein:
the first message comprises a third indication; and
the third indication instructs the first device to perform data recovery, clear a data packet, or deliver a Protocol Data Unit (PDU) corresponding to a first Service Data Unit (SDU) to a Radio Link Control (RLC) entity, and the third indication further instructs the device to re-establish PDCP.

12. The device according to claim 11, wherein:
the third indication comprises a plurality of values;
one or more first values of the plurality of values instructs the device to re-establish PDCP; and
one or more second values of the plurality of values instructions the device to perform the data recovery, clear the data packet, or deliver the PDU corresponding to the first SDU to the RLC entity.

13. The device according to claim 8, wherein in response to determining that the PDCP entity is a PDCP entity over an unacknowledged-mode (UM) DRB, the first message instructs the device to deliver a Protocol Data Unit (PDU) corresponding to a first Service Data Unit (SDU) to a Radio Link Control (RLC) entity.

14. The device according to claim 8, wherein in response to determining that the PDCP entity is a PDCP entity over an acknowledged-mode (AM) data radio bearer (DRB), the first message instructs the device to recover data.

15. A method, comprising:
sending, by a second device, a first message to a first device, wherein a cell handover or a cell change has occurred, and wherein a Packet Data Convergence Protocol (PDCP) entity uses a key before the cell handover or the cell change, and wherein the first message comprises a first indication and a second indication,
the first indication instructing the first device to perform at least one of the following operations: a data recovery, a discarding of a data packet, or a delivery of a protocol data unit(PDU) corresponding to a first Service Data Unit (SDU) to a Radio Link Control (RLC) entity, and
the second indication instructing to re-establish the RLC entity.

16. The method according to claim 15, wherein:
in response to determining that the PDCP entity is a PDCP entity over an acknowledged-mode (AM) data radio bearer (DRB), the first message instructs the first device to recover data;
in response to determining that the PDCP entity is a PDCP entity over an unacknowledged-mode (UM) DRB, the first message instructs the first device to deliver a Protocol Data Unit (PDU) corresponding to a first Service Data Unit (SDU) to a Radio Link Control (RLC) entity; or
in response to determining that the PDCP entity is a PDCP entity over a signaling radio bearer (SRB), the first message instructs the first device to clear the data packets.

17. The method according to claim 15, further comprising discarding data packets based on the first message, wherein the data packet being discarded based on the first message comprises all SDUs and PDUs stored in the PDCP entity.

18. A device, comprising:

at least one processor; and at least one memory, the at least one memory comprising instructions that when executed by the at least one processor, cause the device to:

send, by a second device, a first message to a first device, wherein a cell handover or a cell change has occurred, and wherein a Packet Data Convergence Protocol (PDCP) entity uses a key before the cell handover or the cell change, and wherein the first message comprises a first indication and a second indication, the first indication instructing the first device to perform at least one of the following operations: a data recovery, a discarding of a data packet, or a delivery of a protocol data unit (PDU) corresponding to a first Service Data Unit (SDU) to a Radio Link Control (RLC) entity, and the second indication instructing to re-establish the RLC entity.

19. The device according to claim 18, wherein:

in response to determining that the PDCP entity is a PDCP entity over an acknowledged-mode (AM) data radio bearer (DRB), the first message instructs the first device to recover data;

in response to determining that the PDCP entity is a PDCP entity over an unacknowledged-mode (UM) DRB, the first message instructs the first device to deliver a Protocol Data Unit (PDU) corresponding to a first Service Data Unit (SDU) to a Radio Link Control (RLC) entity; or in response to determining that the PDCP entity is a PDCP entity over a signaling radio bearer (SRB), the first message instructs the first device to clear the data packets.

20. The device according to claim 19, further comprising instructions to discard data packets based on the first message, wherein the data packet being discarded based on the first message comprises all SDUs and PDUs stored in the PDCP entity.

* * * * *